(No Model.)

J. P. BONNELL.
DITCHING MACHINE.

No. 264,062. Patented Sept. 12, 1882.

3 Sheets—Sheet 1.

Witnesses:
Ernest Jones
Jeremiah Kane

Inventor:
John P. Bonnett
per Edw. W. Down & Co.
Attys.

(No Model.) 3 Sheets—Sheet 2.
J. P. BONNELL.
DITCHING MACHINE.
No. 264,062. Patented Sept. 12, 1882.
Fig. 3.
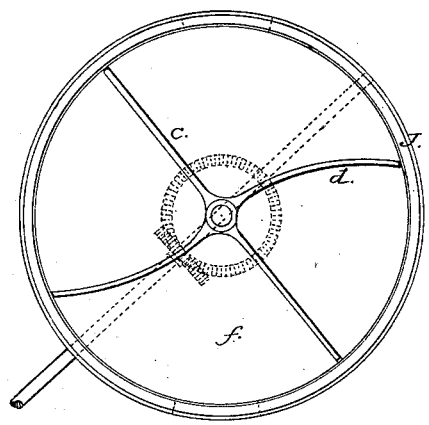
Fig. 4.
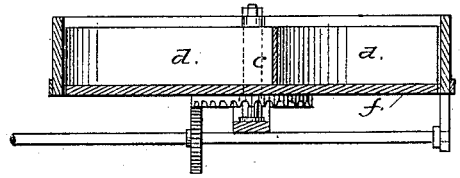
Fig. 5.
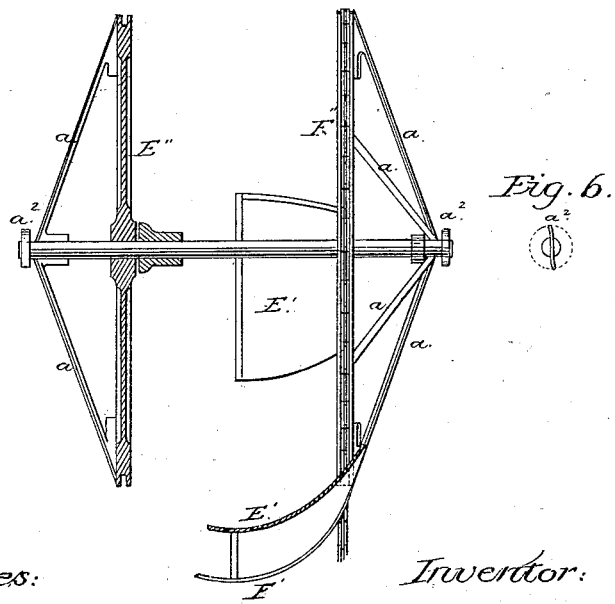
Fig. 6.
Witnesses:
Ernest Jones
Jeremiah Kane
Inventor:
John P. Bonnell
per Edw. W. Down & Co.
Attys.

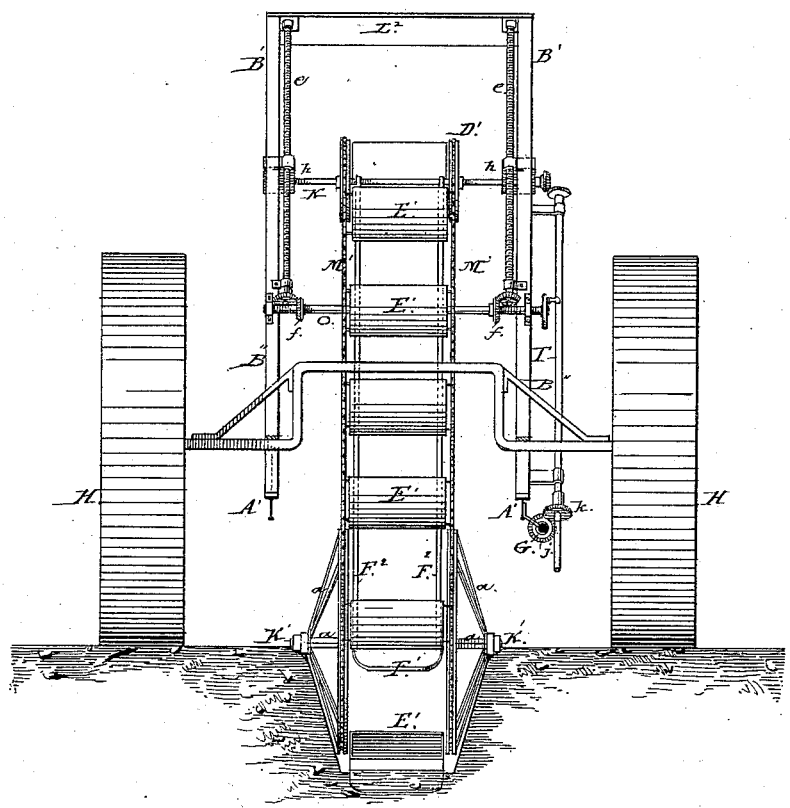

UNITED STATES PATENT OFFICE.

JOHN P. BONNELL, OF GREEN VILLAGE, NEW JERSEY.

DITCHING-MACHINE.

SPECIFICATION forming part of Letters Patent No. 264,062, dated September 12, 1882.

Application filed July 30, 1881. (No model.)

*To all whom it may concern:*

Be it known that I, JOHN P. BONNELL, of Green Village, in the county of Morris and State of New Jersey, have invented certain new and useful Improvements in Ditching-Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention is an improvement in ditching-machines.

It consists, first, in certain improvements in the elevator-buckets whereby a cut is made in the soil by cutters attached to said buckets in their rears for the purpose of loosening the ground for the bucket following.

It consists, also, in an improvement in the lower skeleton drum for the endless chain, which is provided with cutting-arms radiating from the axis and attached to the periphery or band of the pulleys, the purpose of which improvement is to aid the buckets in forming a ditch with sloping sides, all of which will be fully set forth hereinafter.

It consists, also, of a device connected with the rear end of the machine immediately under the point of discharge of the buckets, for the purpose of receiving the dirt and throwing the same (by centrifugal force produced by the rotation of an S-shaped or plain arm pivoted on a vertical shaft moved indirectly from the source of power) out of the way of the machine and evenly over the land.

Figure 1:
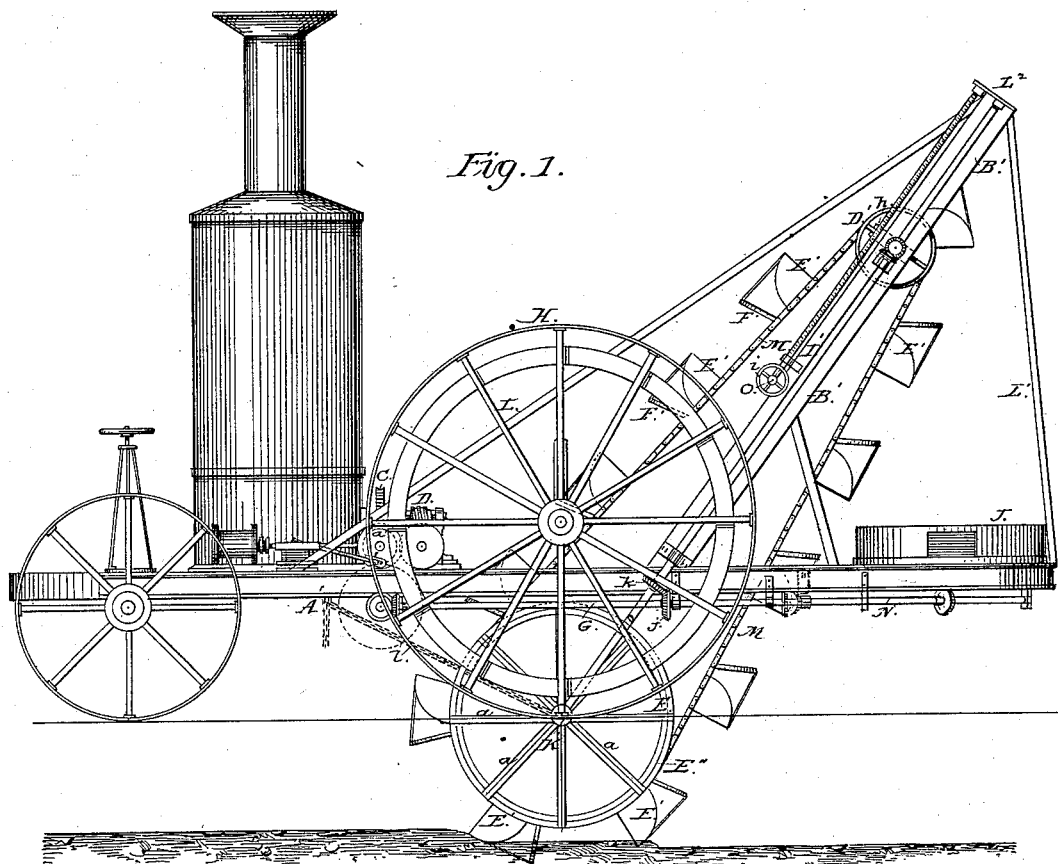
Figure 2:
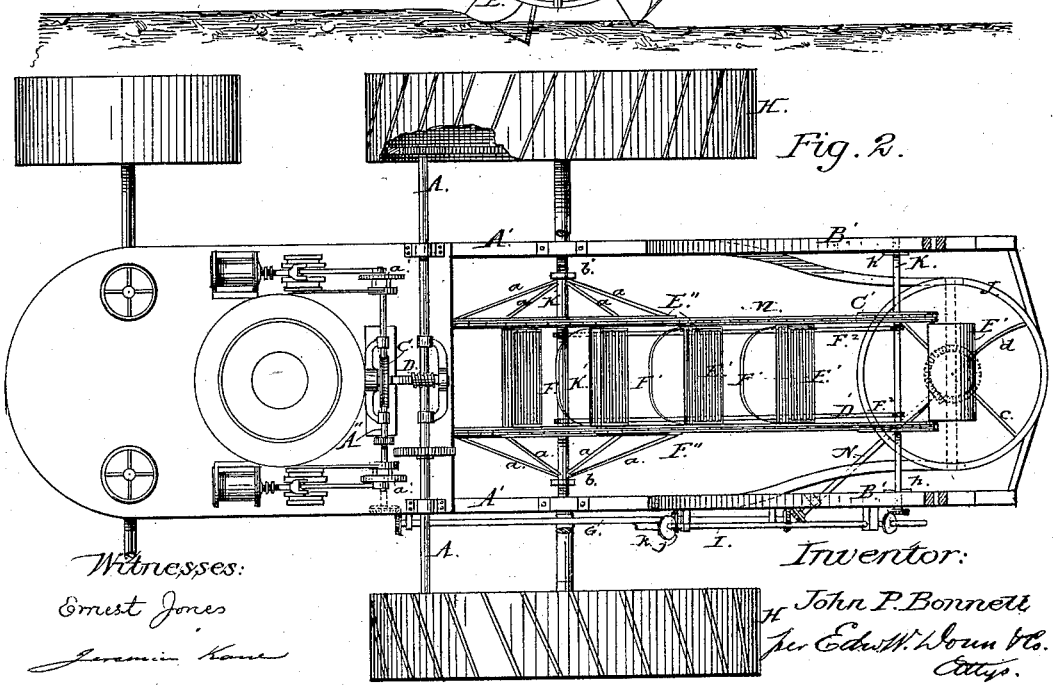

Figure 1 is a side elevation of my machine complete. Fig. 2 is a plan of the same. Fig. 3 is an enlarged plan of dirt-receiving cylinder. Fig. 4 is a vertical section of same. Fig. 5 shows a section and elevation combined of the lower skeleton drum, &c. Fig. 6 shows an end view of the small knife or cutter on the end of the lower skeleton-drum shaft. Fig. 7 is a sectional view of the machine, showing the buckets and the carrying parts of the same in elevation.

Similar reference-letters indicate like parts in all the figures.

Referring to drawings, A' is the frame of the machine, constructed, in a manner to secure strength combined with economy of arrangement, of suitable materials, and mounted on four wheels, two of which are large and hold a fixed relative position to said frame, while the two others are small, relatively, and may be moved about an axis for steering purposes, as will be hereinafter mentioned.

The two large traction-wheels H have circular racks within their bands, adapted to mesh with pinions fixed on a shaft which connects them. The treads of said wheels are made purposely broad, and provided on their peripheries with diagonally-arranged ribs adapted to take hold of the ground on which they bear.

The frame B'' is composed of arms formed of double beams B', placed side by side, with spaces between them to form ways on either side, in which are placed housings $h$ to form bearings for a shaft, K, supporting the upper skeleton drum. These beams or uprights B' are placed obliquely upon the horizontal beams A', and braced to position by stays L L', and united at the top by a cross beam or plate, L². The shafts K K' are united by rods F² to keep the upper and lower skeleton drums relatively together. These pulleys are grooved on their outside bands to receive the endless chains, which carry the excavating-buckets. The upper drum or pulleys have no special construction to be claimed; but the lower drum, formed of pulleys E'' F'', is peculiar in construction and formation, and has a cutting function in conjunction with the elevator-buckets, which will be specially mentioned hereinafter.

The skeleton-drums formed of pulleys C' D' E'' F'' are connected by two separate endless chains, M, which pass over them and carry the excavating-buckets to and from their work. The buckets E, of the desired number, are fixed to the chains M', on either side, in such a way as not to interfere with a free movement of said chains about the pulleys or skeleton drums, they being held, however, sufficiently firm to keep them stiff while cutting their way in the soil and carrying off their loads. These buckets E' are about the width of the space between the pulleys, which are parts of the said drums, and of the form shown in the drawings, a transverse section of which would show the outline of a quadrant. These buckets have attached to them and the chains on either side bowed knives F′, so placed as to follow immediately in rear of said buckets. These knives or cutters F′ are intended to cut and loosen the earth to a proper depth beneath the last feed, so as to relieve the bucket following of a part of its work. The wheels or pulleys which are a part of the lower skeleton drum are provided with arms a, connected to the outer edges of said pulleys on either side, and respectively unite at the outer ends of the shaft, which forms their axis of motion. The appearance of the cutting portion of the pulleys is that of a skeleton cone with its apex projecting outward. The arms of these lower pulleys are edged for the purpose of cutting the sides of the ditch in their rotary movement, giving to said cut a sloping surface, while the scoops or buckets cut and receive the earth, carrying it away immediately thereafter. The axle of pulleys E″ F″ is provided at each end with small knives, slightly bent, to serve the purpose of clearing away places for said shaft in the movement of the lower drum and buckets while in the act of forming a ditch. The movement of the upper and lower pulleys is taken from the shaft K, which connects the pulleys C′ D′, and said shaft K is provided with a bevel-gear wheel, which meshes with a corresponding wheel on the end of shaft I. The shaft I has a spline formed upon it, which engages with a groove in the bevel-wheel k, so that when the shaft K is lifted or lowered by the screws, hereinafter described, to move the buckets to different planes of adjustment, the shaft I, being also moved, slides through the wheel k to allow said wheel to remain in position with relation to the wheel j on the horizontal shaft G.

The obliquely-fixed uprights B′, which rise from the frame A′ as a base, are stayed to position by suitable braces, L L′, attached to the head of said uprights and the frame A′. The frame of which uprights B′ form a part is provided with suitable ways, in which slide journal-bearings of the skeleton drums to carry the buckets to suitable adjustments when at work.

A shaft, O, journaled in suitable bearings in the uprights B′, has fixed upon it bevel-wheels f, which gear with corresponding gear-wheels, g, fixed on screw-threaded shafts e. These screw-threaded shafts are supported from bearings in the said uprights B′, and mesh with screw-threaded blocks h, which form housings to the shaft K. When it is desirable to adjust the buckets to given horizontal planes the crank-wheel i is moved to turn the screws, which in turn draw or push the housings, and with them the shaft of the upper drum. Chains l, attached to the horizontal beams and the shaft of the lower drum, serve to steady the lower drum while the buckets are at work.

At one end of the horizontal frame of my machine I place or fix a cylindrical box, J, adapted to receive the earth from the buckets just after they have reached their highest point of elevation and have turned to go down to their work. A vertical shaft is provided in this cylindrical receiver, properly journaled, which has attached to it an arm or a set of arms, c d, of an S or other suitable shape, which receive from the source of power a horizontal rotary movement about their axis, to press and throw, by centrifugal force, the dirt and other matter dropped from the buckets violently through openings in the sides of the said cylinder J off into the fields on either side of the machine. The arms c d are firmly attached to a vertical shaft on a table, f, within the receiving-cylinder J, which is rotated by means of the gear-wheels beneath.

An engine located in the forward part of the vehicle is set upon a base properly constructed, which serves to drive the machine from place to place, and also to carry or move the elevator-buckets and feed the machine to its work. Two steering-wheels are placed forward of the engine, which are connected by pinions to a center spur-wheel fixed to the axle of the forward wheels, I. By a movement of either of the said steering-wheels the axle of the said forward wheels may be "cut" to direct the movement of the vehicle. On either side of the engine-boiler are steam-cylinders, the pistons of which connect with pitmen, which drive crank-wheels a′. A shaft connecting the crank-wheels a′ is provided with a worm or screw centrally placed thereon, which meshes with a toothed wheel, C, immediately above it, to drive another shaft provided with a screw, D. This latter screw meshes with a toothed wheel fixed upon a long shaft, A, provided with pinions at either end, which engage with the circular racks of the large traction-wheels. This shaft A, with its pinions, serves to move the vehicle over the land.

Upon the crank-shaft A″ is fixed a pinion, which gears with a spur-wheel on a shaft beneath the crank-shaft A″ to drive a bevel-wheel meshing with a corresponding gear on a long shaft, G, placed parallel with the side beams of the frame A′. At a point on the shaft G opposite the base of the frame B′ is fixed a bevel-wheel, which engages a corresponding wheel fixed on a shaft, I′, journaled in said frame B′. At the upper end of said shaft I′ is a bevel-gear wheel, which meshes with a similar wheel fixed on a horizontal shaft which unites the two pulleys of the upper skeleton drum. Motion is imparted to the endless chains by the system of gearing just described to carry the buckets or scoops to and from their work.

To the end of the shaft G is fixed a bevel-gear wheel, which meshes with a correspondent fixed on a shaft, N, which extends toward the axis of the cylinder J, and a spur-gear wheel on its end connects with a corresponding wheel fixed to the vertical shaft, which forms the axis of the table f and the driving or rotating arms c d. All shafts to which gear-wheels are fixed are supported in suitable journal-bearings fixed to contiguous beams at proper points.

I am aware of patent to Remington, No. 4,539, which shows and describes a pair of revolving clearers working in conjunction with each other on an incline plane of a shovel to raise and throw to one side the cuttings of a ditch, and to such I make no claim.

Having thus described my invention, what I claim as new, and desire to secure by Letters Patent, is—

1. The U-shaped cutter F', attached to opposite chains and united to the buckets at an outer central point, as and for the purpose set forth.

2. The pulleys which form parts of the lower skeleton drum, provided with cutting or shaping arms connected to the axis of said drum and to the rims of said pulleys, as and for the purpose set forth.

3. The combination of the buckets fixed on the endless chains with the lower skeleton drum, constructed as described, to co-operate with said buckets in forming and digging the ditch, as and for the purpose specified.

4. The horizontal rotary table $f$, provided with arms attached thereto, in combination with the dirt-receiver J, as and for the purpose set forth.

5. In combination with a chain of elevator-buckets, the receiver J and rotary table $f$, as and for the purpose specified.

6. The centrifugal dirt-throwing device, composed of the rotating arms described, the cylindrical receptacle, and the rotary table, in combination with the dumping scoops or buckets, substantially as and for the purpose set forth.

7. In combination with the lower skeleton drum, the knives $a^2$, substantially as and for the purpose set forth.

In testimony that I claim the foregoing as my own I affix my signature in presence of two witnesses.

JOHN P. BONNELL.

Witnesses:
EDWARD C. LYON,
AUG. F. W. CUTLER.